United States Patent
Aftab et al.

(10) Patent No.: US 10,680,898 B2
(45) Date of Patent: Jun. 9, 2020

(54) MINI-CLOUD DEPLOYMENT SYSTEM

(71) Applicant: AT&T Intellectual Property I, L.P., Atlanta, GA (US)

(72) Inventors: Syed Anwar Aftab, Budd Lake, NJ (US); John Murray, Denville, NJ (US); Kazi Farooqui, Morganville, NJ (US); Mazin Gilbert, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/912,822

(22) Filed: Mar. 6, 2018

(65) Prior Publication Data

US 2019/0280935 A1 Sep. 12, 2019

(51) Int. Cl.
*H04L 12/24* (2006.01)
*H04L 12/46* (2006.01)

(52) U.S. Cl.
CPC .......... *H04L 41/12* (2013.01); *H04L 12/4641* (2013.01); *H04L 41/145* (2013.01)

(58) Field of Classification Search
CPC .... H04L 12/4641; H04L 41/12; H04L 41/145
See application file for complete search history.

(56) References Cited

U.S. PATENT DOCUMENTS

| | | | |
|---|---|---|---|
| 8,819,790 B2* | 8/2014 | Eom | H04L 63/164 726/4 |
| 9,021,009 B2 | 4/2015 | Van Biljon et al. | |
| 9,106,530 B1* | 8/2015 | Wang | H04L 41/12 |
| 9,628,379 B2 | 4/2017 | Nedeltchev et al. | |
| 9,813,303 B1* | 11/2017 | Guigli | H04L 61/2076 |
| 10,057,127 B2* | 8/2018 | Zhu | H04W 28/08 |
| 10,057,273 B1* | 8/2018 | Chakraborty | H04L 63/105 |
| 10,244,076 B2* | 3/2019 | Sivasankaran | H04L 67/32 |
| 2014/0160977 A1* | 6/2014 | Serbest | H04W 40/02 370/254 |
| 2014/0317261 A1 | 10/2014 | Shatzkamer et al. | |
| 2014/0325622 A1* | 10/2014 | Luk | H04L 63/083 726/6 |
| 2016/0065448 A1* | 3/2016 | Loveless | G09C 1/00 370/218 |
| 2016/0127226 A1 | 5/2016 | Bays | |
| 2016/0191341 A1* | 6/2016 | Sivasankaran | H04L 67/32 709/220 |

(Continued)

FOREIGN PATENT DOCUMENTS

WO WO-2013007158 A1 * 1/2013 ........... H04L 12/467

*Primary Examiner* — Eric Nowlin
(74) *Attorney, Agent, or Firm* — BakerHostetler

(57) ABSTRACT

An automated and model driven mini-cloud deployment method comprising: instantiating a model driven orchestrator; parsing a blueprint to develop a virtual network function topology including: identifying infrastructure components required to establish at least one virtual network function; identifying at least one dependency for the at least one virtual network function; providing a sequence for calling life cycle operations; the model driven orchestrator effectuates the life cycle operations comprising: establishing a uCPE as a tenant within a network registry, configuring the uCPE, and activating the uCPE; and instantiating the at least one virtual network function on the uCPE according to the virtual network function topology.

14 Claims, 5 Drawing Sheets

(56) References Cited

U.S. PATENT DOCUMENTS

| | | | |
|---|---|---|---|
| 2016/0203544 A1* | 7/2016 | Smits | G06Q 30/0635 |
| | | | 705/26.81 |
| 2016/0239595 A1* | 8/2016 | Maes | G06F 9/5061 |
| 2016/0330140 A1 | 11/2016 | Cook et al. | |
| 2016/0337206 A1 | 11/2016 | Bugenhagen et al. | |
| 2016/0366023 A1* | 12/2016 | Higgins | H04L 41/12 |
| 2016/0373297 A1* | 12/2016 | Ng | G06F 9/45558 |
| 2017/0012823 A1* | 1/2017 | Zhu | H04W 28/08 |
| 2017/0070412 A1 | 3/2017 | Kanevsky | |
| 2017/0116022 A1 | 4/2017 | Khalid et al. | |
| 2017/0134237 A1* | 5/2017 | Yang | H04L 41/12 |
| 2017/0142007 A1 | 5/2017 | Nedeltchev et al. | |
| 2017/0180325 A1* | 6/2017 | Palermo | H04L 63/04 |
| 2017/0289060 A1 | 10/2017 | Aftab et al. | |
| 2018/0006898 A1 | 1/2018 | Kanza et al. | |
| 2018/0145889 A1* | 5/2018 | Xu | H04L 41/0806 |
| 2018/0146031 A1* | 5/2018 | Li | H04L 41/0806 |
| 2018/0248788 A1* | 8/2018 | Tsiatsis | H04L 45/38 |
| 2019/0082004 A1* | 3/2019 | Bosch | H04L 67/10 |
| 2019/0109756 A1* | 4/2019 | Abu Lebdeh | G06F 9/45558 |
| 2019/0146827 A1* | 5/2019 | Yu | G06F 9/45558 |

* cited by examiner

MINI-CLOUD DEPLOYMENT SYSTEM

TECHNICAL FIELD

This disclosure relates generally to a system for automatically deploying Virtual Network Functions (VNF) on a mini-cloud, aka uCPE (Universal Customer Premises Equipment) and, more specifically, to a model-driven automated process of deploying VNF topologies on mini cloud (uCPE).

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated.

One benefit of cloud computing is the elastic nature of the cloud and the ability to share resources among users and/or spin up virtual resources on demand. Elasticity of resources extends to processing power, storage, bandwidth, virtual functions, and virtual machines. The amount of resources that can be sourced through cloud computing incorporates nearly all facets of computing from raw processing power to storage space. Increasingly, customers are demanding mini-cloud structures to provide localized cloud platforms. The mini-cloud structure may be implemented with Universal Customer Premises Equipment (uCPE) when provided at a customer site.

Presently, deployment of virtual network function topology within a mini-cloud is largely a manual process. While the creation of virtual machines (VM), virtual network functions (VNFs), and virtual channels may be automated, there is a manual handover from one automated step to another. In addition, there is no centralized end to end deployment plan or automation to guide the overall topology deployment. It will be appreciated that such a plan must encompass multiple VNFs that need to be deployed and chained within the uCPE. Currently, a network administrator or other person responsible for the deployment of the uCPE must use a service design tool to compose the VNF topology including making individual and explicit action requests on a master service orchestrator (MSO) for deployment and activation of uCPE and each VNF. The person must also determine any chaining relationships between VNFs and develop a sequence for creating the VNFs and chaining them together.

The disclosure includes examples addressing at least one of these problems.

SUMMARY

According to an example, the disclosure generally provides a mini-cloud deployment method comprising: instantiating a Model Driven Orchestrator (MDO) parsing a blueprint to develop a virtual network function topology including: identifying infrastructure components required to establish at least one virtual network function; identifying at least one dependency for the at least one virtual network function; providing a sequence for calling life cycle operations; the model driven orchestrator effectuates the life cycle operations comprising: establishing a uCPE as a tenant within a network registry, configuring the uCPE, and activating the uCPE; and instantiating the at least one virtual network function on the uCPE according to the virtual network function topology.

A further example provides a network device comprising a processor, an input/output device coupled to the processor, and a memory coupled with the processor, the memory comprising executable instructions that when executed by the processor cause the processor to effectuate operations comprising: parsing a blueprint to develop a virtual network function topology including: identifying infrastructure components required to establish at least one virtual network function; identifying at least one dependency for the at least one virtual network function; providing a sequence for calling life cycle operations; the model driven orchestrator effectuates the life cycle operations comprising: establishing a uCPE as a tenant within a network registry, configuring the uCPE, and activating the uCPE; and instantiating the at least one virtual network function on the uCPE according to the virtual network function topology Another example provides a computer memory comprising executable instructions that cause a processor to effectuate operations comprising: parsing a blueprint to develop a virtual network function topology including: identifying infrastructure components required to establish at least one virtual network function; identifying at least one dependency for the at least one virtual network function; providing a sequence for calling life cycle operations; the model driven orchestrator effectuates the life cycle operations comprising: establishing a uCPE as a tenant within a network registry, configuring the uCPE, and activating the uCPE; and instantiating the at least one virtual network function on the uCPE according to the virtual network function topology.

Still another example provides a system for deploying a mini-cloud, the system comprising: a uCPE comprising a processor, an input/output device coupled to the processor, and a memory coupled with the processor, the memory comprising executable instructions that when executed by the processor cause the processor to effectuate operations comprising: instantiating a model driven orchestrator; parsing a blueprint to develop a virtual network function topology including: identifying infrastructure components required to establish at least one virtual network function; identifying at least one dependency for the at least one virtual network function; providing a sequence for calling life cycle operations; the model driven orchestrator effectuates the life cycle operations comprising: establishing a uCPE as a tenant within a network registry, configuring the uCPE, and activating the uCPE; instantiating the at least one virtual network function on the uCPE according to the virtual network function topology.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

The mini cloud such as the uCPE disclosed herein is an emerging architecture. The ability to deploy networking solutions such as flexware and network function on demand (NFoD) in a fast and fully automated fashion is highly desirable. For example, customer satisfaction depends on how fast mini-cloud applications can be deployed and how accurately they meet their specified deployment requirements. Each networking solution is different—different component types (VNFs) and different topology (dependencies) between them. Current deployment practices consist of manually developing the deployment plans and then going through a testing phase before their use. This is a long and cumbersome process and is a barrier to the fast and accurate deployment of thousands of customer applications that need to be deployed on these mini clouds. The present disclosure provides a solution to at least one of these problems.

According to the examples described more completely below, the deployment method and system herein includes generation of deployment orchestration plan, i.e., the blueprint, directly from the application topology model is the key enabler. This assures the deployment plan to meet the deployment requirements. The disclosure also improves efficiency of the platform by performing deployment in an automated manner. By eliminating the manual steps, the method and system provide for faster and more accurate deployment of multitude of networking solutions across customer site on mini cloud—the uCPE. In one example, a service design tool user (PIM/LE) makes explicit calls/requests on MSO to deploy, provision, and activate VNFs. The proposed Model Driven Orchestrator (MDO) makes these calls, on the appropriate infrastructure system without human intervention. The MDO determines the sequence in which the VNFs are deployed in uCPE. The information in the TOSCA Models (i.e., the inter-VNF dependency relationships) is used by MDO to determine the deployment sequence. The information in the TOSCA Models (the uCPE and VNF lifecycle operations) also identifies the actions that need to be called on the infrastructure. The TOSCA Blueprint is used to display/visualize VNF Topology on Composition Editor in Service Design Tool. Additionally, the TOSCA blueprint is used to drive the underlying infrastructure to sequence the activation of uCPE and for the creation, deployment, and chaining VNFs based on the information (i.e. metadata) contained in the model. The user (PIM/LE) do not need to make individual calls to activate uCPE and to deploy each VNF. The user (LE) submits the entire topology for deployment to MDO. MDO takes care of sequencing and making requests on underlying infrastructure.

Figure 1:
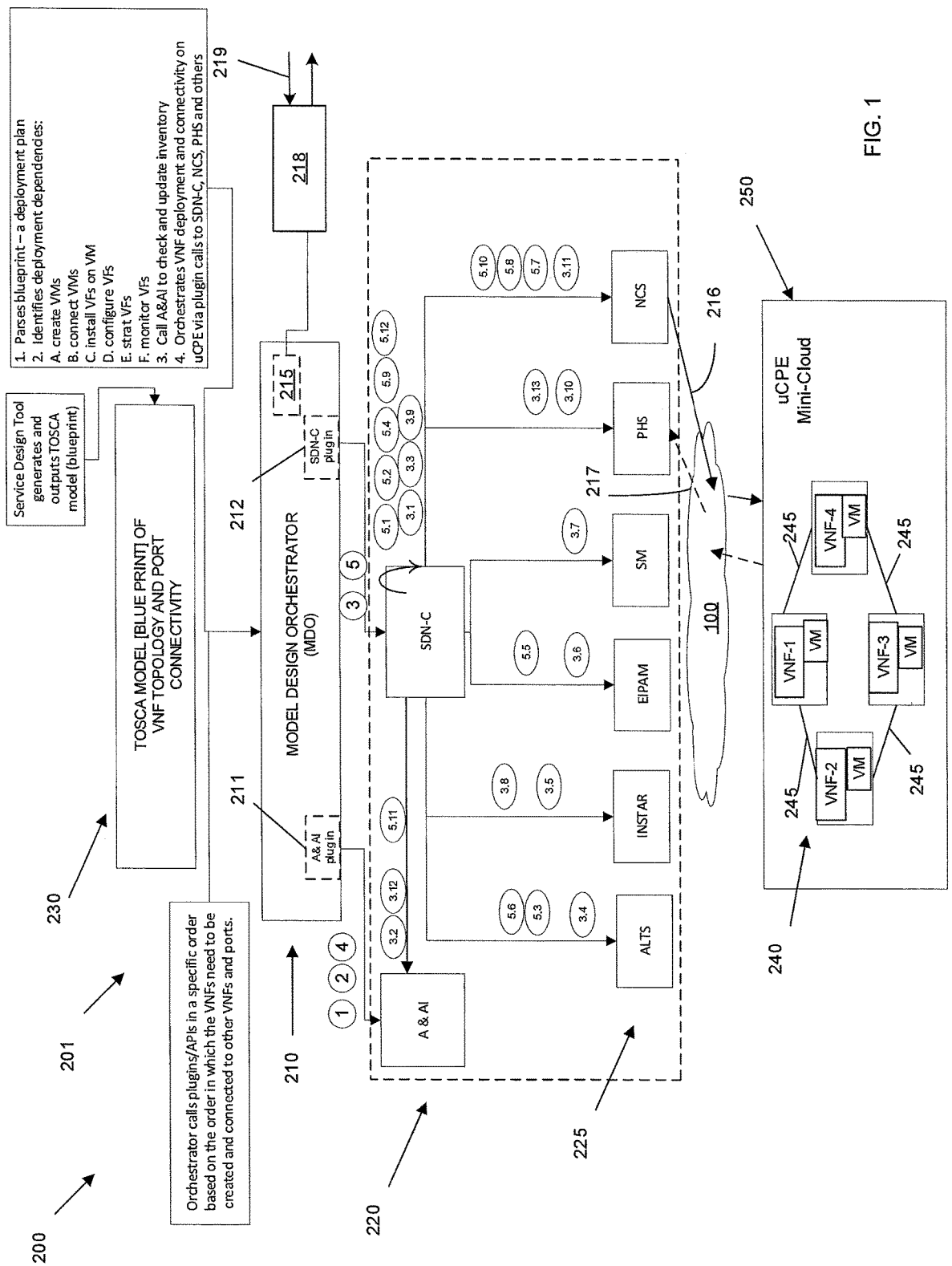
FIG. 1 is a representation of a mini-cloud deployment system according to an example.

With reference to FIG. 1, a network 100 including but not limited to a software defined network (SDN) may be used to deploy a localized cloud or mini-cloud. Such a mini-cloud may be deployed to a customer leveraging virtual resources from network in conjunction with on-site hardware or universal computing premises equipment (uCPE). For example, uCPE may be an x86 based compute box running Linux and a KVM hypervisor.

With continued reference to FIG. 1, a system for deploying VNF topologies on such a platform on a mini-cloud is generally indicated by the number 200. System 200 includes a model driven orchestrator 210. Model driven orchestrator 210 is in communication with a topology provisioning system, generally indicated at 220. Model driven orchestrator may also communicate with a TOSCA blue print, generally indicated at 230. TOSCA blue print 230, the MDO 210 and the Topology Provisioning System (TPS) 220 resides in a computing device with its own processor, memory, I?O units, etc. as shown as 201 in FIG. 1.

TOSCA blue print 230 includes requirements of each VM hosting a VNF including but not limited to memory, processor, cpu, disk size and VNF images. The blue print 230 may further include the methods that need to be called to create the VMs and the VNFs; connectivity/dependency relationship between VNFs; and the methods that need to be called to stitch the VNFs together, via a VLAN. TOSCA blue print 230 may further include connectivity of a VNF to WAN Port and LAN Port—the methods that need to be called to create this connectivity via the VLANs. TOSCA blue print may further include operation calls to activate the various VNFs. It will be understood that the TOSCA template is one example of a blue print 230 that may be stored in a memory of a computing device 201. System 200 and MDO 210 may interact with other templates for mini-cloud hardware.

MDO 210 parses the TOSCA blue print 230 to develop a VNF deployment plan 215 including but not limited to identifying deployment dependencies; creating VMs; connecting VMs; installing VNFs on VM; configuring VNFs; strat VNFs; monitoring VNFs (Monitoring Plugin exists); establishing calls to check and update inventory; and orchestrating VNF deployment and connectivity on uCPE via Plugin Calls to SDN-C, NCS, PHS, etc. These operations are mapped to plug ins incorporate in MDO including, for example, A&AI plug in 211 and SDN-C plug in 212.

Figure 2A:
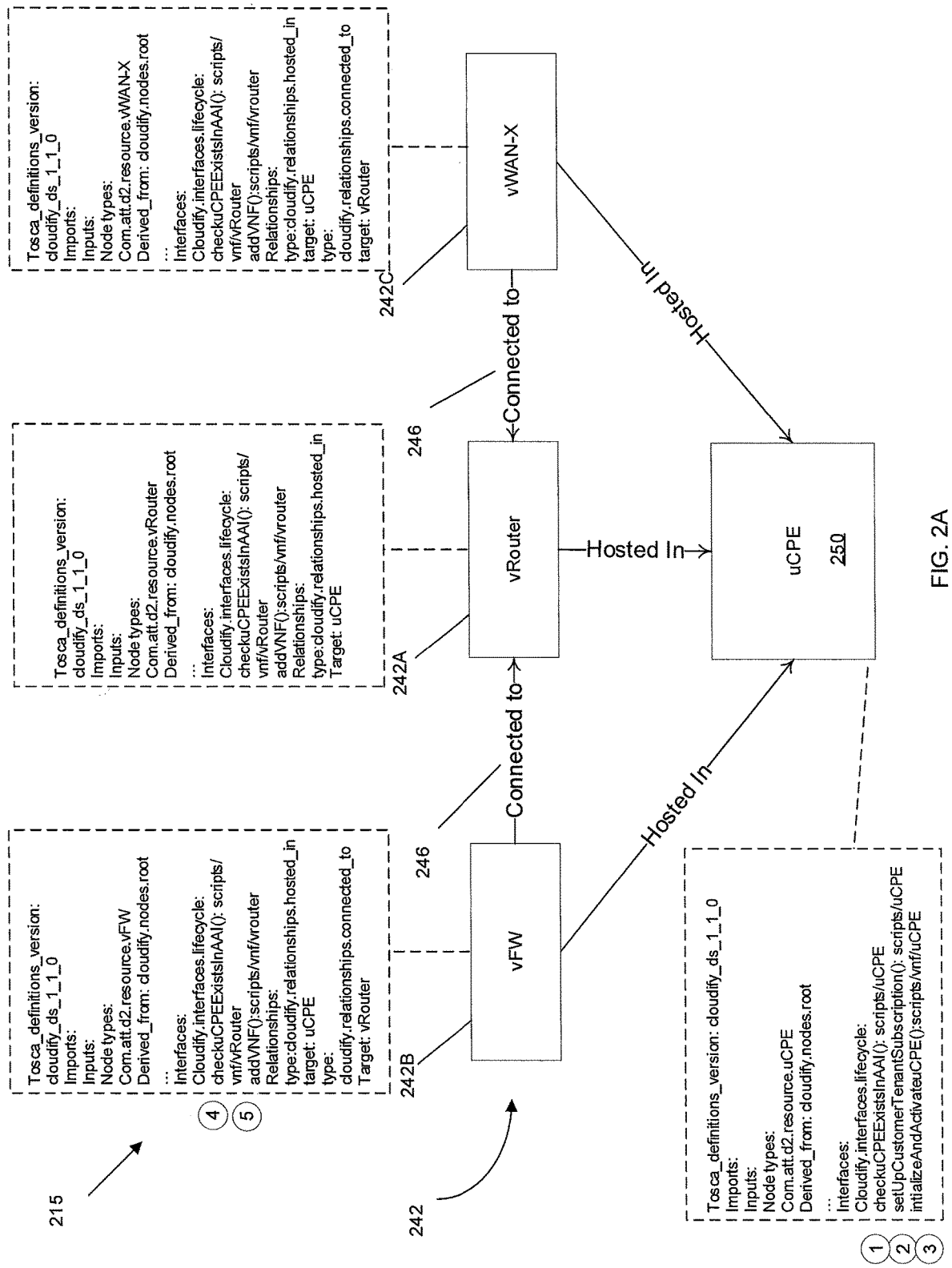
FIG. 2A is a representation of a blueprint in a mini-cloud deployment hardware according to an example.

With reference to FIG. 2A, an example deployment plan 215 is schematically shown. In the example, a uCPE 250 having virtual network functions 242 (vFW, vRouter, and vWAN-X) is provided. Deployment plan 215 schematically shows the dependencies 246 between the VNFs 242 at 246. In this example, the vFW and vWAN-X will be connected to vRouter making them dependent on vRouter. All of the VNFs will be hosted in the uCPE. Example scripts for the deployment plan 215 are also schematically shown including lifecycle operations 1-5, described more completely below. The deployment plan 215 also includes for each addVNF operation 5, the steps of creating a VM; downloading a VNF image; installing the VNF image on the uCPE; configuring the VNF; and activating the VNF. The plan 215 may include calls to downstream applications, generally indicated by the number 225, such as A&AI, INSTAR, EIPAM, ALTS, PHS, SM and NCS to accomplish uCPE and VNF activation and chaining. In the example, deployment plan 215 leverages existing infrastructure, for example, using cloudify as an orchestrator with the MDO 210.

With reference to 2B, a method of deployment inside a mini-cloud is generally indicated at 260. Method 260 includes instantiating an MDO at 261. As discussed, the MDO parses the blue print to create a deployment plan at 262. Deployment plan 215 includes the steps needed to deploy the uCPE 250 and deploy a mini-cloud including but not limited to identifying dependencies at 263, creating virtual machines 264, installing virtual functions on virtual machines 265, configuring the virtual functions 266, monitoring the virtual functions 267, establishing calls to check/update inventory 268, and orchestrating deployment connectivity plug-in calls at 269. Once the deployment plan 215 is constructed according to these steps, MDO executes the plan 215 to deploy the mini-cloud at step 275.

According to one example, MDO 210 identifies the TOSCA nodes (uCPE, VNFs, WAN Ports, LAN Ports), the dependency between them, the operations associated with each node's interfaces and sequences the invocations of these node operations based on the dependency relationship between the nodes. In one example, the bottom most dependency is identified and implemented first. This is a hosted in relationship whose target is the uCPE node. The operations specified in the uCPE node are called by the MDO 210 first in sequence. MDO 210 also calls operations listed in the deployment plan 215 on corresponding plug ins. In the example, two plug ins, a first plug in 211 (A&AI) and second plug in 212(SDN-C), are present. In other examples more or fewer plug ins may be used. These plug ins 211,212 communicate with topology provisioning system 220 including downstream applications 225, such as, A&AI, INSTAR, EIPAM, ALTS, PHS, SM and NCS.

For example, according to a first operation 1, MDO 210 checks on the first plug 211 if the uCPE exists in an A&AI registry. If the uCPE does not exist, an entry is created for it in the A&AI 221. According to a second operation 2, MDO 210 on first plug in 211 may create a customer as a tenant in the A&AI registry 221 including providing required customer details. According to a third operation 3, MDO 210 calls on second plug in 212 (SDN-C) to install and configure the uCPE. MDO 210 may additionally call on second plug in 212 to activate uCPE 250.

Figure 2B:
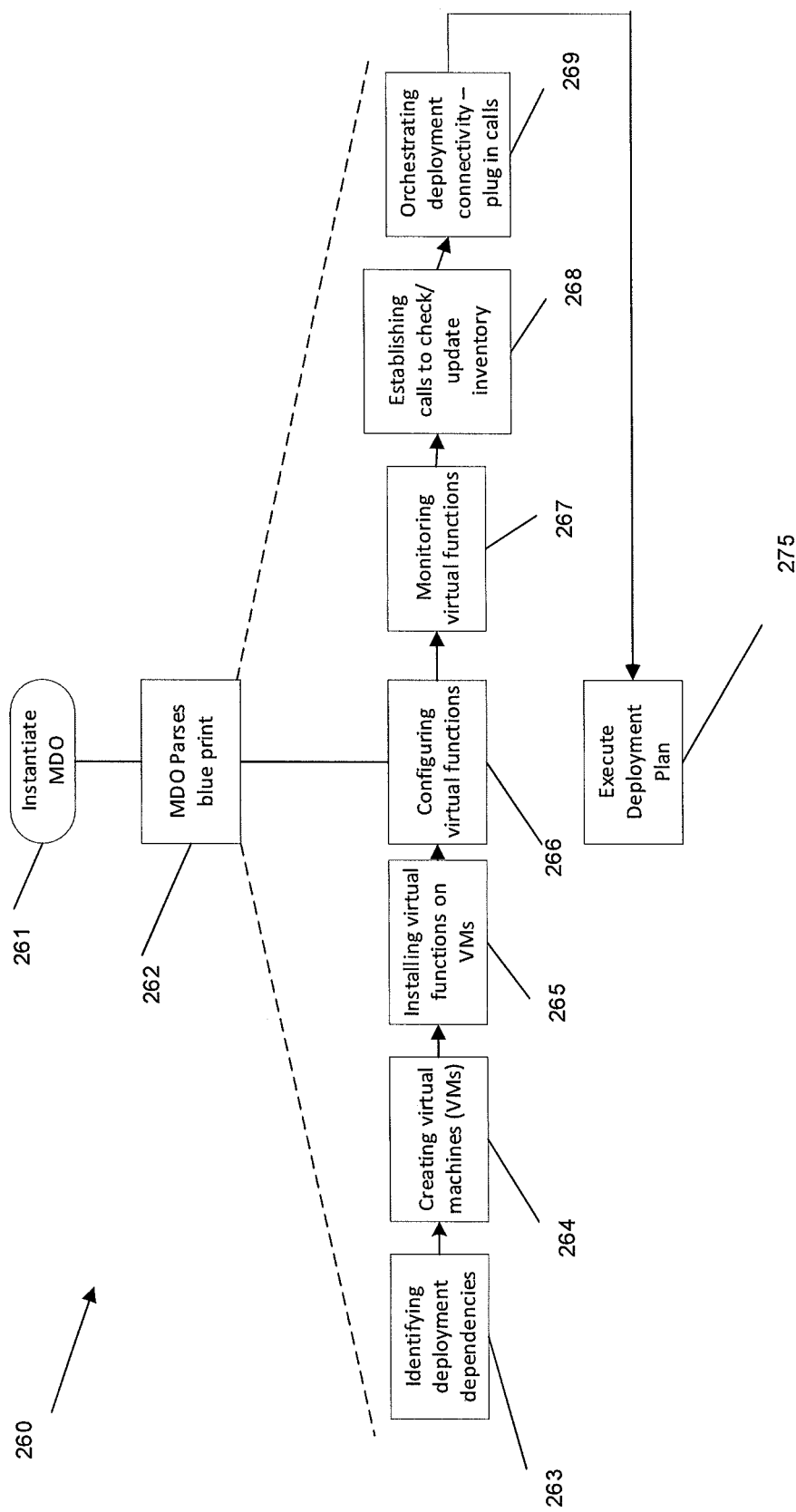
FIG. 2B is a flow diagram depicting a method of deploying a mini-cloud according to an example.

With reference to FIG. 2, in one example, the MDO 210 call to second plug in 212 results in the second plug in 212 calling the following operations on sub systems within TPS 220:

a. SDN-C determines the PHS and NCS to use—interaction (3.1)

b. SDN-C retrieves the uCPE serial, vendor and model number from A&AI based on the uCPE hostname identified in the blueprint—interaction (3.2)

c. For each VNF in the topology, SDN-C prepares MCAP-related data and VNF dev characteristics—interaction (3.3)

d. SDN-C retrieves license entitlements from ALTS—interaction (3.4)

e. SDN-C retrieves circuit data for each WAN port from INSTAR—interaction (3.5)

f. SDN-C retrieves IP addresses to be assigned to VNFs 242 from EIPAM—interaction (3.6)

g. If IPSec is required, SDN C retrieves IPSec block from Service Manager (SM)—interaction (3.7)

h. If VPN is on any WAN port, SDN-C retrieves VPN data from INSTAR—interaction (3.8)

i. SDN-C assigns IP addresses to OA&M and other internal uCPE SDN networks—interaction (3.9)

j. SDN-C sets up PHS with the uCPE download event—interaction (3.10)

k. SDN-C calls NCS to activate uCPE 250—interaction (3.11). At interaction 3.11, the activation communication 216 from SDN 100 defining uCPE locally i.e. at a customer location.

l. SDN-C updates the provisioning status of uCPE 250 in A&AI—interaction (3.12)

m. SDN-C deletes the uCPE download event record at 217 in PHS—interaction (3.13).

Once the lowest level dependency is satisfied, MDO 210 resolves to the next higher level of dependency or, if possible, satisfies the next higher level in parallel. With reference to FIG. 2A, vFW and vWAN-X are dependent upon the instantiation and activation of vRouter VNF. The dependency, indicated by the number 246, requires, vFW 242B and vWAN-X 242C to be connected to vRouter 242A. In this example, MDO 210 first activates vRouter followed by activating vFW and vWAN-X in parallel.

According to a fourth operation 4, MDO 210 calls on first plug in 211 to check if uCPE already exists in the A&AI registry 221 and check on its status. According to a fifth operation 5, MDO 210 calls on second plug in 212 to create the VM, download VNF image, install a VNF on Ucpe, configure the VNF and activate the VNF. In the example shown, this MDO call results in second plug in 212 (SDN-C) calling the following operations on subsystems with the TPS 220:

a. SDN-C internally verifies that the AT&T part number supplied by Service Design Tool exists in its database—interaction (5.1).

b. SDN-C determines if a license is required based on the VNF reference data—interaction (5.2).

c. SDN-C retrieves the VNF license, if required from ALTS—interaction (5.3).

d. SDN-C assigns the management VLAN IP from the existing IP block—interaction—(5.4).

e. If VNF is ATT managed, SDN-C retrieves IP address to be assigned to it from EIPAM—interaction (5.5).

f. SDN-C stores VNF data in A&AI registry—interaction (5.6).

g. SDN-C calls NCS to create an instance of VNF in uCPE—interaction (5.7).

h. SDN-C calls NCS to set up (configure) VNF—interaction (5.8).

i. SDN-C internally validates that uCPE is ready for validation—interaction (5.9).

j. SDN-C calls NCS to activate the VNF—interaction (5.10).

k. SDN-C calls A&AI to update the provisioning status of VNF—interaction (5.11).

l. SDN-C internally updates the VNF status. According to another operation, the MDO creates VMs, installs a VNF image, VNF configs, starts VNFs, set up VNF connectivity, assigns VLAN IDs, connect VNFs to WAN and LAN ports via VLANs 242 (FIG. 2). In the example, four VNFs are provided. It will be understood that more or fewer VNFs may be provided to form mini-cloud 250.

Figure 2C:
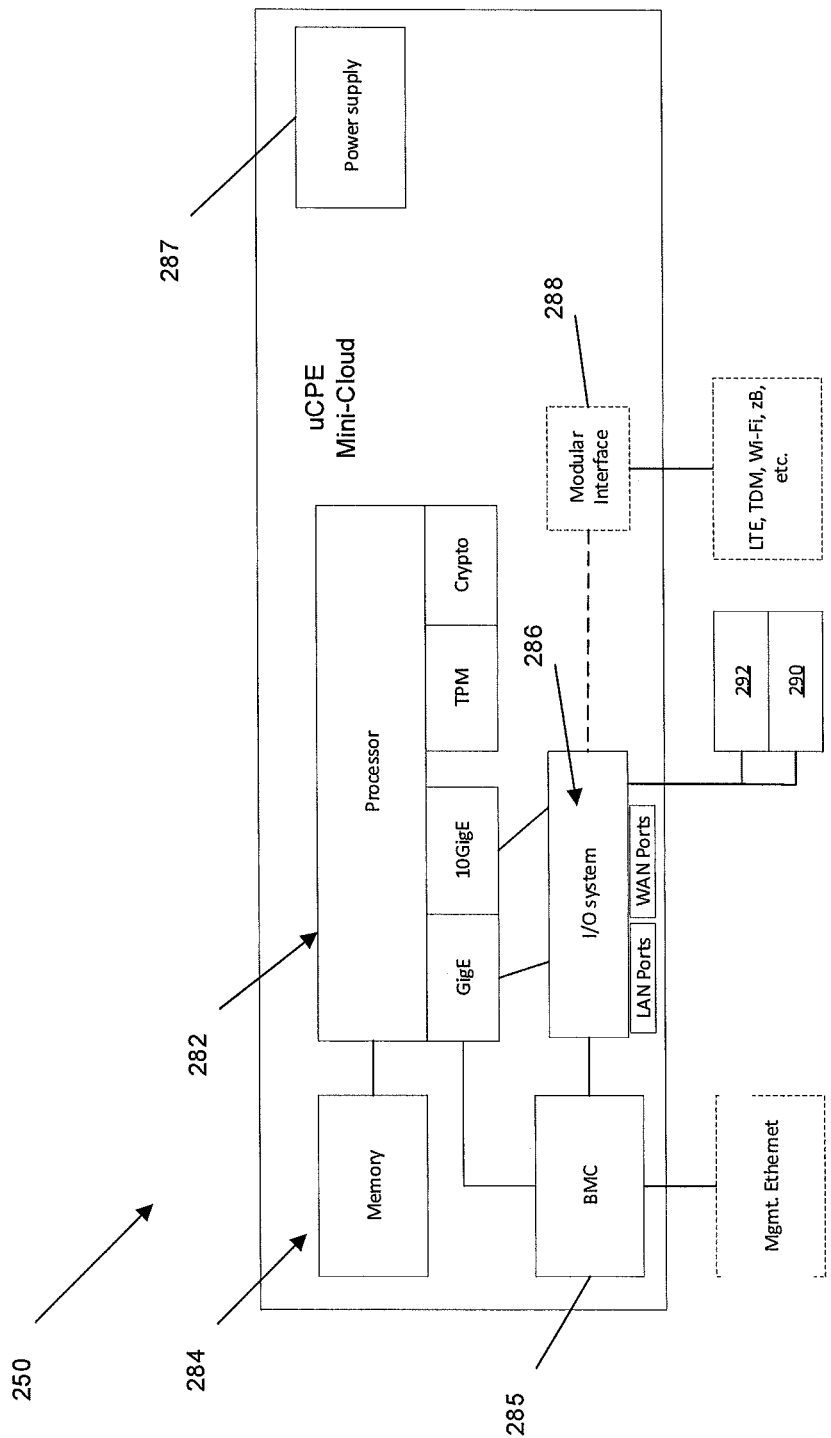
FIG. 2C is a representation of a mini-cloud deployment hardware according to an example showing details of a uCPE.

As referenced above, uCPE 250 may be implemented in any computing device. With reference to FIG. 2C, components of the uCPE 250 are shown. In this example, uCPE 250 hardware may contain a processor 282 and a memory 284 coupled to the processor 282. Memory 284 may include volatile and non-volatile memory structures. In the depicted example, memory 284 includes a random access memory coupled to an x86 processor 282. Memory 284 may contain executable instructions that when executed by processor 284 effectuate operations associated with deploying a mini-cloud including forming virtual network functions to support the mini-cloud environment as described above.

In addition to processor 282 and memory 284, uCPE 250 may include an input/output system 286. Processor 282, memory 284, and input/output system 286 may be coupled together to allow communications between them. In the example, a Baseboard Management Controller (BMC) is provided to couple processor 282 and memory 284 to input/output 286. BMC 285 may provide a connection to interface with an management Ethernet as shown. Input/output system 286 may include LAN ports and WAN ports as shown. The uCPE 250 further includes a power supply 287. Power supply 287 may be a single or dual power supply to provide reliable power for the components of the uCPE 250.

Each portion of uCPE 250 may comprise circuitry for performing functions associated with each respective portion. Thus, each portion of system 200 may comprise hardware, or a combination of hardware and software. Accordingly, each portion of uCPE 250 and system 200 is not to be construed as software per se. Input/output system 266 may be capable of receiving or providing information from or to a communications device or other network entities configured for telecommunications. For example input/output system 266 may include a wireless communications (e.g., 3G/4G/GPS) card. Input/output system 266 may be capable of receiving or sending video information, audio information, control information, image information, data, or any combination thereof. Input/output system 286 may be capable of transferring information with system 200. In various configurations, input/output system 286 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 286 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 286 of uCPE 250 also may contain a communication connection 268, such as the modular connection shown, that allows uCPE 250 to communicate with other devices, network entities, or the like. Communication connection 268 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 266 also may provide a connection to an input device 290 such as keyboard, mouse, pen, voice input device, or touch input device. Input/output system 286 may also include an output device 292, such as a display, speakers, or a printer.

Memory 284 of uCPE 250 may comprise a storage medium having a concrete, tangible, physical structure. As is known, a signal does not have a concrete, tangible, physical structure. Memory 284, as well as any computer-readable storage medium described herein, is not to be construed as a transient signal or a propagating signal. Memory 284, as well as any computer-readable storage medium described herein, is to be construed as an article of manufacture. Memory 284 may comprise executable instructions that, when executed by processor 282, cause processor 282 to effectuate operations to instantiate a MDO 210, prepare a deployment plan 215 and deploy a mini-cloud as described above.

Figure 3:
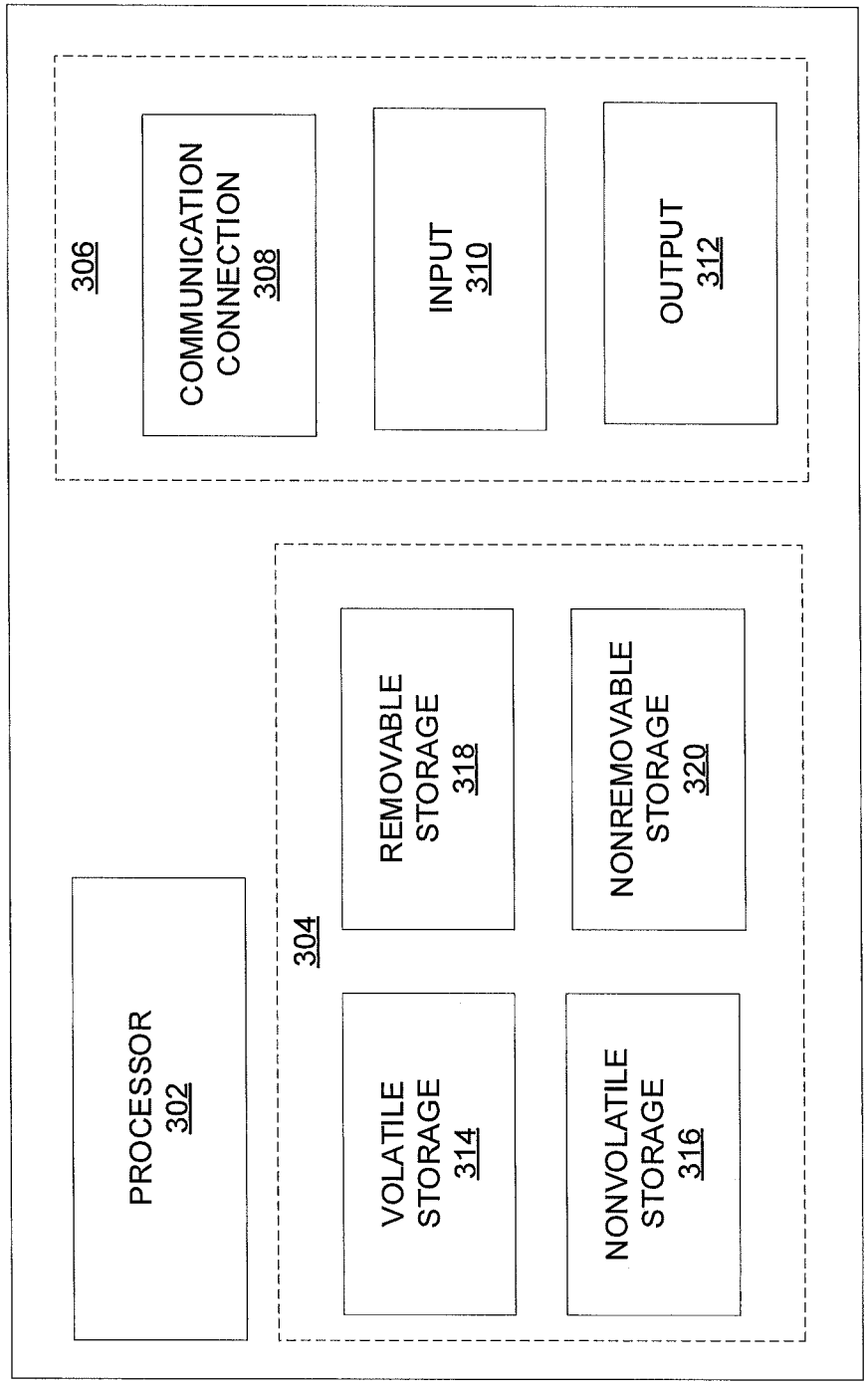
FIG. 3 is a representation of a network device according to an example.

According to one example, system 200 and model driven orchestrator 210 may be implemented in a network device. FIG. 3 illustrates a functional block diagram depicting one example of a network device, generally indicated at 300. Network device 300 may be provided within uCPE. Network device 300 may comprise a processor 302 and a memory 304 coupled to processor 302. Memory 304 may contain executable instructions that, when executed by processor 302, cause processor 302 to effectuate operations associated with deploying a mini-cloud including forming virtual network functions to support the mini-cloud environment as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to prepare a deployment plan 215 and deploy a mini-cloud as described above. As described above, system 200 including MDO 210 and TPS 220 may be incorporated in an SDN 100. SDN 100 may be implemented in a variety of network architectures. The examples contained herein, therefore, should not be considered limiting.

EXAMPLES

Example 1

A mini-cloud deployment method comprising: instantiating a model driven orchestrator parsing a blueprint to develop a virtual network function topology including: identifying infrastructure components required to establish at least one virtual network function; identifying at least one dependency for the at least one virtual network function; providing a sequence for calling life cycle operations; the model, driven orchestrator effectuates the life cycle operations comprising: establishing a uCPE as a tenant within a network registry, configuring the uCPE, and activating the uCPE; and instantiating the at least one virtual network function on the uCPE according to the virtual network function topology.

Example 2

The method of example 1, wherein the step of providing a sequence includes satisfying a lowest level dependency before resolving a higher level dependency.

Example 3

The method of example 1, wherein the step of configuring the uCPE includes retrieving uCPE identifying information from the registry based on a uCPE hostname identified in the blueprint; preparing MCAP related data and virtual VNF dev characteristics; and retrieving IP addresses to be assigned to the at least one virtual network function.

Example 4

The method of example 1, wherein the life cycle operations further comprise: instantiating at least one plug in within the model driven orchestrator, the at least one plug in performing operations comprising:
a. determining the PHS and NCS to use;
b. retrieving the uCPE serial, vendor and model number from an A&AI based on the uCPE hostname identified in the blueprint;
c. for each VNF in the topology, preparing MCAP-related data and VNF dev characteristics;
d. retrieving license entitlements from an ALTS;
e. retrieving circuit data for each WAN port from INSTAR;
f. retrieving at least one IP address to be assigned to the at least one VNF from EIPAM;
g. assigning an IP address to at least one OA&M
h. updating the provisioning status of uCPE in the A&AI; and
i. deleting the uCPE download event record in the PHS.

Example 5

The method of example 4 further comprising: retrieving an IPSec block from a service manager.

Example 6

The method of example 4 further comprising: retrieving VPN data from INSTAR.

Example 7

The method of example 4 further comprising: assigning an IP address to at least one internal uCPE SDN network.

Example 8

The method of example 4 further comprising: setting up a PHS with the uCPE download event.

Example 9

The method of example 1, wherein the step of establishing includes calling an NCS to activate uCPE.

Example 10

The method of example 1, wherein the step of activating a uCPE includes sending an activation communication from an NCS on an SDN to establish the Ucpe outside of the SDN.

Example 11

A network device comprising a processor, an input/output device coupled to the processor, and a memory coupled with the processor, the memory comprising executable instructions that when executed by the processor cause the processor to effectuate operations comprising: parsing a blueprint to develop a virtual network function topology including: identifying infrastructure components required to establish at least one virtual network function; identifying at least one dependency for the at least one virtual network function; providing a sequence for calling life cycle operations; the model driven orchestrator effectuates the life cycle operations comprising: establishing a uCPE as a tenant within a network registry, configuring the uCPE, and activating the uCPE; and instantiating the at least one virtual network function on the uCPE according to the virtual network function topology.

Example 12

The network device of example 11, wherein the step of providing a sequence includes satisfying a lowest level dependency before resolving a higher level dependency.

Example 13

The network device of example 11, wherein the step of configuring the uCPE includes retrieving uCPE identifying information from the registry based on a uCPE hostname identified in the blueprint; preparing MCAP related data and virtual VNF dev characteristics; and retrieving IP addresses to be assigned to the at least one virtual network function.

Example 14

The network device of example 11, wherein the life cycle operations further comprise: instantiating at least one plug in within the model driven orchestrator, the at least one plug in performing operations comprising:
   a. determining the PHS and NCS to use;
   b. retrieving the uCPE serial, vendor and model number from an A&AI based on the uCPE hostname identified in the blueprint;
   c. for each VNF in the topology, preparing MCAP-related data and VNF dev characteristics;
   d. retrieving license entitlements from an ALTS;
   e. retrieving circuit data for each WAN port from INSTAR;
   f. retrieving at least one IP address to be assigned to the at least one VNF from EIPAM;
   g. assigning an IP address to at least one OA&M
   h. updating the provisioning status of uCPE in the A&AI; and
   i. deleting the uCPE download event record in the PHS.

Example 15

The network device of example 14 further comprising: retrieving an IPSec block from a service manager.

Example 16

The network device of example 14 further comprising: retrieving VPN data from INSTAR.

Example 17

The network device of example 14 further comprising: assigning an IP address to at least one internal uCPE SDN networks.

Example 18

The network device of example 14 further comprising: setting up a PHS with the uCPE download event.

Example 19

The network device of example 11, wherein the step of establishing includes calling an NCS to activate uCPE.

Example 20

The network device of example 11, wherein the step of activating a uCPE includes sending an activation communication from an NCS on an SDN to establish the Ucpe outside of the SDN.

Example 21

A system for deploying a mini-cloud, the system comprising: a uCPE comprising a processor, an input/output device coupled to the processor, and a memory coupled with the processor, the memory comprising executable instructions that when executed by the processor cause the processor to effectuate operations comprising: instantiating a model driven orchestrator; parsing a blueprint to develop a virtual network function topology including: identifying infrastructure components required to establish at least one virtual network function; identifying at least one dependency for the at least one virtual network function; providing a sequence for calling life cycle operations; the model driven orchestrator effectuates the life cycle operations comprising: establishing a uCPE as a tenant within a network registry, configuring the uCPE, and activating the uCPE; instantiating the at least one virtual network function on the uCPE according to the virtual network function topology.

Example 22

The system of example 21, wherein the at least one virtual network function on the uCPE includes a vRouter, a vFW and a vWAN-X.

While examples of a mini-cloud deployment system and method have been described in connection with various computing devices/processors, the underlying concepts may be applied to any computing device, processor, or system capable of facilitating a mini-cloud deployment system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a mini-cloud deployment method as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing mini-cloud deployment as described herein. When implemented on a general-purpose processor, the program code combines with the processor to provide a unique device that operates to invoke the functionality of a mini-cloud deployment system.

The invention claimed is:

1. A method for a mini-cloud deployment comprising:
instantiating a model driven orchestrator;
parsing a blueprint to develop a virtual network function topology; and
executing deployment of a Universal Customer Premises Equipment (uCPE) and mini-cloud, wherein the executing deployment comprises:
identifying infrastructure components required to establish at least one virtual network function;
identifying at least one dependency for the at least one virtual network function;
providing a sequence for calling life cycle operations;
upon receipt of an input approving the virtual network function topology through an input/output device, determining whether the uCPE exists within a network registry;
in response to the uCPE not existing in the network registry, creating an entry for the uCPE in the network registry;
establishing the uCPE as a tenant within the network registry, configuring the uCPE, and activating the uCPE; and
instantiating the at least one virtual network function on the uCPE according to the virtual network function topology,
wherein the life cycle operations comprise instantiating at least one plug in within the model driven orchestrator, the at least one plug in performing operations comprising:
determining a Payload Header Suppression (PHS) to use;
retrieving the uCPE serial, vendor, and model number from an Active and Available Inventory (A&AI) based on a uCPE hostname identified in the blueprint;
retrieving license entitlements from an Association for Local Telecommunications Services (ALTS);
retrieving circuit data for each wide area network (WAN) port from IP Network Systems and Asset Resource (INSTAR);
assigning an IP address to at least one Operations, Administration & Management (OA&M) network;
updating a provisioning status of uCPE in the A&AI; and
deleting a uCPE download event record in the PHS.

2. The method of claim 1, wherein providing a sequence comprises satisfying a lowest level dependency before resolving a higher level dependency.

3. The method of claim 1, wherein the configuring the uCPE comprises: retrieving uCPE identifying information from the network registry based on the uCPE hostname identified in the blueprint; preparing microcore and perimeter (MCAP) related data and virtual network function (VNF) dev characteristics; and retrieving internet protocol (IP) addresses to be assigned to the at least one virtual network function.

4. The method of claim 1 further comprising: retrieving an Internet Protocol Security (IPSec) block from a service manager.

5. The method of claim 1 further comprising: retrieving virtual private network (VPN) data from INSTAR.

6. The method of claim 1 further comprising: assigning an IP address to at least one internal uCPE SDN network.

7. The method of claim 1 further comprising: setting up a PHS with the uCPE download event.

8. A network device comprising a processor, an input/output device coupled to the processor, and a memory coupled with the processor, the memory comprising executable instructions that when executed by the processor cause the processor to effectuate operations comprising:
instantiating a model driven orchestrator; and
parsing a blueprint to develop a virtual network function topology; and
executing deployment of a Universal Customer Premises Equipment (uCPE) and mini-cloud, wherein the executing deployment comprises:
identifying infrastructure components required to establish at least one virtual network function;
identifying at least one dependency for the at least one virtual network function;
providing a sequence for calling life cycle operations;
determining whether the uCPE exists within a network registry;
in response to the uCPE not existing in the network registry, creating an entry for the uCPE in the network registry;
establishing the uCPE as a tenant within a network registry, configuring the uCPE, and activating the uCPE; and
instantiating the at least one virtual network function on the uCPE according to the virtual network function topology,
wherein the life cycle operations comprise instantiating at least one plug in within the model driven orchestrator, the at least one plug in performing operations comprising:
determining a Payload Header Suppression (PHS) to use;
retrieving the uCPE serial, vendor, and model number from an Active and Available Inventory (A&AI) based on a uCPE hostname identified in the blueprint;
retrieving license entitlements from an Association for Local Telecommunications Services (ALTS);
retrieving circuit data for each wide area network (WAN) port from IP Network Systems and Asset Resource (INSTAR);
assigning an IP address to at least one Operations, Administration & Management (OA&M) network;
updating a provisioning status of uCPE in the A&AI; and
deleting a uCPE download event record in the PHS.

9. The network device of claim 8, wherein providing a sequence comprises satisfying a lowest level dependency before resolving a higher level dependency.

10. The network device of claim 8, wherein configuring the uCPE comprises retrieving uCPE identifying information from the network registry based on the uCPE hostname identified in the blueprint; preparing MCAP related data and virtual VNF dev characteristics; and retrieving IP addresses to be assigned to the at least one virtual network function.

11. The network device of claim 8 further comprising: assigning an IP address to at least one internal uCPE SDN networks.

12. The network device of claim 8 further comprising: setting up a PHS with the uCPE download event.

13. A system for deploying a mini-cloud, the system comprising: a uCPE comprising a processor, an input/output device coupled to the processor, and a memory coupled with the processor, the memory comprising executable instructions that when executed by the processor cause the processor to effectuate operations comprising:
  instantiating a model driven orchestrator;
  parsing a blueprint to develop a virtual network function topology; and
  executing deployment of a Universal Customer Premises Equipment (uCPE) and mini-cloud, wherein the executing deployment comprises:
    identifying infrastructure components required to establish at least one virtual network function;
    identifying at least one dependency for the at least one virtual network function;
    providing a sequence for calling life cycle operations;
    determining whether the uCPE exists within a network registry;
    in response to the uCPE not existing in the network registry, creating an entry for the uCPE in the network registry;
    establishing a uCPE as a tenant within a network registry, configuring the uCPE, and activating the uCPE; and
    instantiating the at least one virtual network function on the uCPE according to the virtual network function topology,
  wherein the life cycle operations comprise instantiating at least one plug in within the model driven orchestrator, the at least one plug in performing operations comprising:
  determining a Payload Header Suppression (PHS) to use;
  retrieving the uCPE serial, vendor, and model number from an Active and Available Inventory (A&AI) based on a uCPE hostname identified in the blueprint;
  retrieving license entitlements from an Association for Local Telecommunications Services (ALTS);
  retrieving circuit data for each wide area network (WAN) port from IP Network Systems and Asset Resource (INSTAR);
  assigning an IP address to at least one Operations, Administration & Management (OA&M) network;
  updating a provisioning status of uCPE in the A&AI; and
  deleting a uCPE download event record in the PHS.

14. The system of claim 13, wherein the at least one virtual network function on the uCPE includes a virtual router (vRouter).

* * * * *